P. B. DELANY.
TELEGRAPHY.
APPLICATION FILED AUG. 24, 1910.
989,577.
Patented Apr. 18, 1911.
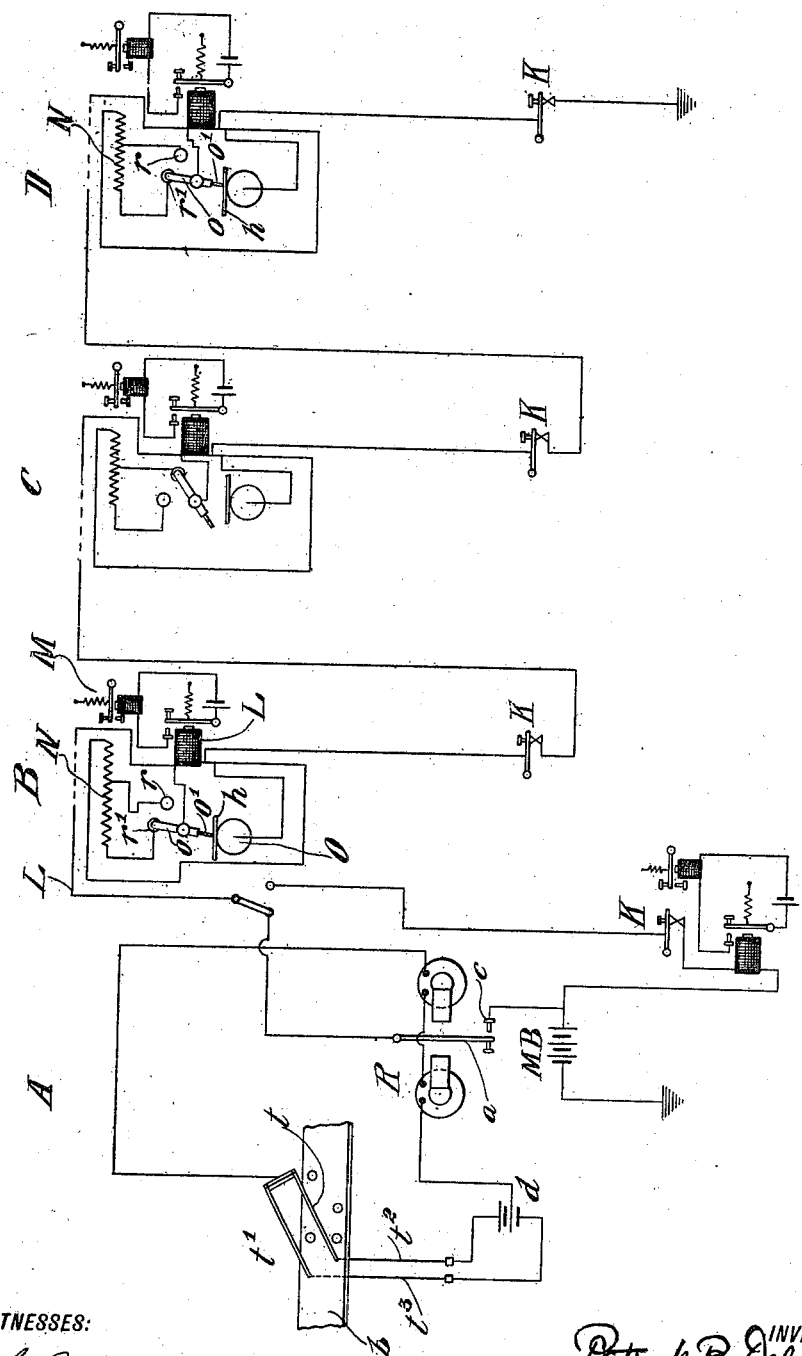
WITNESSES:
C. S. Ashley
L. F. Browning
INVENTOR
Patrick B. Delany
BY Edward C. Davidson
ATTORNEY

UNITED STATES PATENT OFFICE.

PATRICK B. DELANY, OF SOUTH ORANGE, NEW JERSEY, ASSIGNOR TO THE TELEPOST COMPANY, OF NEW YORK, N. Y., A CORPORATION OF MAINE.

TELEGRAPHY.

989,577.  Specification of Letters Patent.  Patented Apr. 18, 1911.

Application filed August 24, 1910. Serial No. 578,719.

*To all whom it may concern:*

Be it known that I, PATRICK B. DELANY, a citizen of the United States, residing at South Orange, Essex county, State of New Jersey, have invented a new and useful Improvement in Telegraphy, of which the following is a specification.

This invention relates more particularly to automatic telegraphy and to the transmission of messages over circuits in which are included intermediate offices or stations, such a circuit being generally termed a "way" circuit. The invention is applicable, not only to "way" circuits having any desired number of "way" stations but also to circuits having terminal stations only.

This invention comprises a new organization whereby the circuit is maintained in practically stable condition electrically, regardless of the number of "way" stations using the automatic apparatus or the Morse instrument, the arrangement being such that a change from one system to the other at one or all of the stations does not disturb materially the normal working condition of the circuit. This is attained by shunting the Morse relay at each station with a resistance and, when the chemical recorder is in use, it is in shunt to both the relay and the resistance. The arrangement is such that when the starting lever of the chemical recorder is moved to throw the recorder into operation, the resistance of the shunt around the relay is increased to a degree equivalent to the lowering of the resistance of the circuit when the chemical recorder is placed in shunt around the resistance and relay; and when the recorder lever is returned to normal position to throw the recorder out of circuit, the resistance shunt is restored to its normal resistance value. Experience has shown that when there is a resistance shunt of about 1,000 ohms around the Morse relay having a resistance of about 150 ohms, and both are shunted by the chemical recorder sufficient current will be diverted through the latter to make a plain record at high speed over an ordinary circuit. Owing to the self-induction of the relay, the record will be plain and distinct. As the resistance of the tape of the chemical recorder may be made to approximate 500 ohms, the variation, caused by the recorder being thrown into or out of operation, will be compensated by automatically changing the resistance of the resistance coil to the extent of 500 ohms each time the recorder lever is moved, increasing the resistance of the coil in one case and decreasing it in the other. Thus it will be seen that normally all the signaling relays in the circuit are shunted by resistance of fixed value, say 500 ohms, so that all are on a par. If a terminal office, for instance, should wish to send automatically to one of the "way" offices, the introduction of the chemical recorder as an additional shunt at the "way" office does not destroy the balance of the circuit and all the other relays being in adjustment they would show automatically that the line is in use. Should a terminal office desire to drop a copy at all the stations, each station would be equally provided with current. The resistance shunts around the relays may be regulated to the resistance of the particular relays in use, the resistance of the line, and the power used in transmission. Once this adjustment or adaptation is properly made, no alteration would be necessary as varying conditions of the line will affect the arrangement of the relays, resistance shunt and chemical recorder shunt in the ratio of their permanent relationship.

The accompanying drawing is a diagrammatic view, illustrating this invention:

A represents a transmitting station; B a way station receiving on its chemical recorder; C a way station not receiving on its recorder but like the other stations its Morse relay is in circuit; D represents a terminal station receiving on its recorder.

At sending station A, $t$, $t'$ are the transmitting contact fingers pressing on top of a perforated transmitting tape $b$; $t^2$, $t^3$ are contacts beneath the tape connected to the terminals of battery $d$ the middle of which is connected through the coils of a polarized relay transmitter R to the upper contact fingers $t$, $t'$. The armature $a$ of the relay is connected to line L. When the lower one of two perforations in line perpendicular to tape $b$, representing a dot, passes between the upper contact $t$ and the lower contact $t^2$ a positive impulse is sent through the coils of polarized relay R and moves its armature $a$ to contact $c$. A current is then sent into the main line L from main battery MB and a record is made on chemical tapes $h$, at intermediate station B and terminal station D until the upper one of said pair of perforations in transmitting tape $b$ passes between contacts $t'$, $t^3$ when the negative pole of battery $d$ reverses polarized relay R breaking the circuit of the line and main battery MB at $c$. The time between contact through the lower and upper perpendicular perforations represents a dot. The next two perforations being angularly placed cause a longer time to elapse between the impulses in the local circuit and the armature $a$ of polarized relay R is held against its contact $c$ for a time, representing a dash, which, with the preceding dot signal, constitutes the letter "a" of the Morse code.

At each station is a Morse key K, relay L and sounder M. The coil of the relay is shunted by an adjustable resistance N and also by a chemical recorder O.

Station C is represented as not recording the message intended for B and D. When the levers $o$ of the chemical recorders at B and D were drawn forward so as to bring the recording fingers $o'$ to bear on the tapes $h$ the resistances of shunts N were increased from say 500 ohms to 1000 ohms by the levers $o$ being moved from points $r$ of the resistance coils to points $r'$ but this change was offset by the contact of the recording fingers with the chemical tapes which at B and D created another shunt around the relay and resistance equivalent to the rise in the resistances N. The relay at C therefore remained in adjustment and gave notice that the line was being used for automatic transmission. If C had also taken a copy of the message on his recorder, B and D would not have been affected by it for the reasons already described.

It is not deemed necessary to describe the operation of the Morse features of the system, the relays, sounders and keys being disposed in the ordinary and well known way. The Morse is used for calling, acknowledgments of automatic reception or, if need be, for ordinary traffic when the rapid automatic system is not required.

I claim:

1. In telegraphy the combination of a circuit, a transmitter therein, an electro-magnetic receiver in the circuit, a resistance shunting the electro-magnetic receiver and a chemical recorder shunting the electro-magnetic receiver and the resistance.

2. In telegraphy the combination of a circuit, an electro-magnet therein, a resistance in parallel with the electro-magnet and a chemical recorder in parallel with the electro-magnet and the resistance.

3. In telegraphy the combination of a circuit, a transmitter therein, an electro-magnet in the circuit, a resistance in parallel with the electro-magnet, a receiver in parallel with the electro-magnet and the resistance, and means controlled by said receiver for varying the resistance of said resistance.

4. In telegraphy the combination of a circuit, a transmitter in said circuit, two receivers in parallel in the circuit and a resistance in parallel with both receivers.

In testimony whereof, I have hereunto subscribed my name.

PATRICK B. DELANY.

Witnesses:
LAURISTON BUNKER,
EMMA COOK.